United States Patent
Li et al.

(10) Patent No.: US 12,047,345 B2
(45) Date of Patent: Jul. 23, 2024

(54) ACCESS POINT NAME CONFIGURATION METHOD AND APPARATUS, AND READABLE STORAGE MEDIUM

(71) Applicant: ZTE Corporation, Shenzhen (CN)

(72) Inventors: Xipeng Li, Shenzhen (CN); Song Dang, Shenzhen (CN); Zitao Xue, Shenzhen (CN); Jiani Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 177 days.

(21) Appl. No.: 17/442,879

(22) PCT Filed: Jul. 22, 2020

(86) PCT No.: PCT/CN2020/103437
§ 371 (c)(1),
(2) Date: Sep. 24, 2021

(87) PCT Pub. No.: WO2021/042893
PCT Pub. Date: Mar. 11, 2021

(65) Prior Publication Data
US 2022/0191170 A1 Jun. 16, 2022

(30) Foreign Application Priority Data
Sep. 6, 2019 (CN) .......................... 201910847222.X

(51) Int. Cl.
*H04W 24/08* (2009.01)
*H04L 61/3015* (2022.01)
(Continued)

(52) U.S. Cl.
CPC .......... *H04L 61/3015* (2013.01); *H04W 8/02* (2013.01); *H04W 24/08* (2013.01); *H04W 48/16* (2013.01); *H04L 2101/375* (2022.05)

(58) Field of Classification Search
CPC .... H04L 61/3015; H04W 8/02; H04W 24/08; H04W 48/16
(Continued)

(56) References Cited

U.S. PATENT DOCUMENTS

| 2012/0099578 A1* | 4/2012 | Aramoto | H04W 8/20 370/338 |
| 2014/0161026 A1* | 6/2014 | Stojanovski | H04W 76/15 370/328 |

(Continued)

FOREIGN PATENT DOCUMENTS

| CN | 101990280 A | 3/2011 |
| CN | 103702390 A | 4/2014 |

(Continued)

OTHER PUBLICATIONS

European Search Report for corresponding application EP20860048; Report dated Sep. 19, 2022.
(Continued)

*Primary Examiner* — Ted M Wang
(74) *Attorney, Agent, or Firm* — CANTOR COLBURN LLP

(57) ABSTRACT

Provided are an Access Point Name (APN) configuration method and apparatus, and a readable storage medium. The APN configuration method includes: determining, by a terminal, an APN category of a candidate APN, wherein the APN category includes an APN used in a 5G network or an APN used in a non-5G network; determining, by the terminal, a network mode of the terminal according to a configuration parameter of the terminal, wherein the network mode includes a network mode supporting the 5G network or a network mode not supporting the 5G network; and determining, by the terminal, according to whether the APN category matches the network mode, whether to execute network access based on the candidate APN.

16 Claims, 3 Drawing Sheets

(51) Int. Cl.
*H04W 8/02* (2009.01)
*H04W 48/16* (2009.01)
*H04L 101/375* (2022.01)

(58) Field of Classification Search
USPC .......................................................... 455/425
See application file for complete search history.

(56) References Cited

U.S. PATENT DOCUMENTS

2016/0302168 A1  10/2016  Keller
2018/0092142 A1   3/2018  Han
2019/0223013 A1   7/2019  Yu

FOREIGN PATENT DOCUMENTS

| CN | 106657428 A | 5/2017 |
| EP | 2192728 A1 | 6/2010 |
| WO | 2013036078 A2 | 3/2013 |
| WO | 2019050349 A1 | 3/2019 |

OTHER PUBLICATIONS

International Search Report for corresponding application PCT/CN2020/103437 filed Jul. 22, 2020; Mail date Sep. 9, 2020.

\* cited by examiner

ACCESS POINT NAME CONFIGURATION METHOD AND APPARATUS, AND READABLE STORAGE MEDIUM

CROSS REFERENCE

This application is a National Stage Filing of the PCT International Application No. PCT/CN2020/103437 filed on Jul. 22, 2020 which claims priority to Chinese Application No. 201910847222.X filed on Sep. 6, 2019, the entirety of which is herein incorporated by reference.

TECHNICAL FIELD

The present disclosure relates to the field of communication technology.

BACKGROUND

With the rapid development and construction of 5th Generation Mobile Networks (5G) technologies, terminals supporting the 5G technologies rapidly increase in recent years. Access Point Name (APN) refers to a network access technology, which is a parameter that needs to be configured when a terminal accesses a network, and determines an access manner used by the terminal to access the network. A terminal can access a wireless data network operated by a telecommunication operator (referred to as operator hereinafter) only after an APN parameter is correctly configured on the terminal, and the APN configuration information corresponding to different operators is different. In a 4th Generation Mobile Communication Technology (4G) network, an APN of an Internet type is unique, and there are few terminals currently supporting the 5G technologies, therefore operators configure an APN dedicated for a 5G network for terminals supporting the 5G technologies, so that terminals, supporting the 5G technologies, of a specific machine type or a specific batch can use the APN dedicated for the 5G network for network access to the 5G network. However, at present, the 5G network is in the early stage of construction, and it is difficult for operators to take full consideration of the influence of the formulation of the new APN dedicated for the 5G network on the existing terminals not supporting the 5G technologies in the process of using the mobile data network, thus resulting in the problem that the mobile terminals not supporting the 5G technologies have an abnormal network access in the case that both the APN used in a 5G network and the APN used in a non-5G network exist.

The above contents are only used for assisting in understanding the technical solutions of the present disclosure, and do not represent an admission that the above contents are prior art.

SUMMARY

One aspect of the embodiments of the present disclosure provides an APN configuration method, including: determining, by a terminal, an APN category of a candidate APN, wherein the APN category of the candidate APN includes an APN used in a 5G network or an APN used in a non-5G network; determining, by the terminal, a network mode of the terminal according to a configuration parameter of the terminal, wherein the network mode includes a network mode supporting the 5G network or a network mode not supporting the 5G network; and determining, by the terminal and according to whether the APN category matches the network mode of the terminal, whether to execute network access based on the candidate APN.

Another aspect of the embodiments of the present disclosure provides an APN configuration apparatus, including: a memory, a processor and an APN configuration program stored in the memory and capable of running on the processor, wherein the APN configuration program implements at least one operation of the APN configuration method when being executed by the processor.

Another aspect of the embodiments of the present disclosure provides a computer-readable storage medium, on which an APN configuration program is stored, wherein the APN configuration program implements at least one operation of the APN configuration method when being executed by a processor.

DETAILED DESCRIPTION OF THE EMBODIMENTS

It should be understood that the exemplary embodiments described herein are only used to explain the present disclosure and are not intended to limit the present disclosure.

Figure 1:
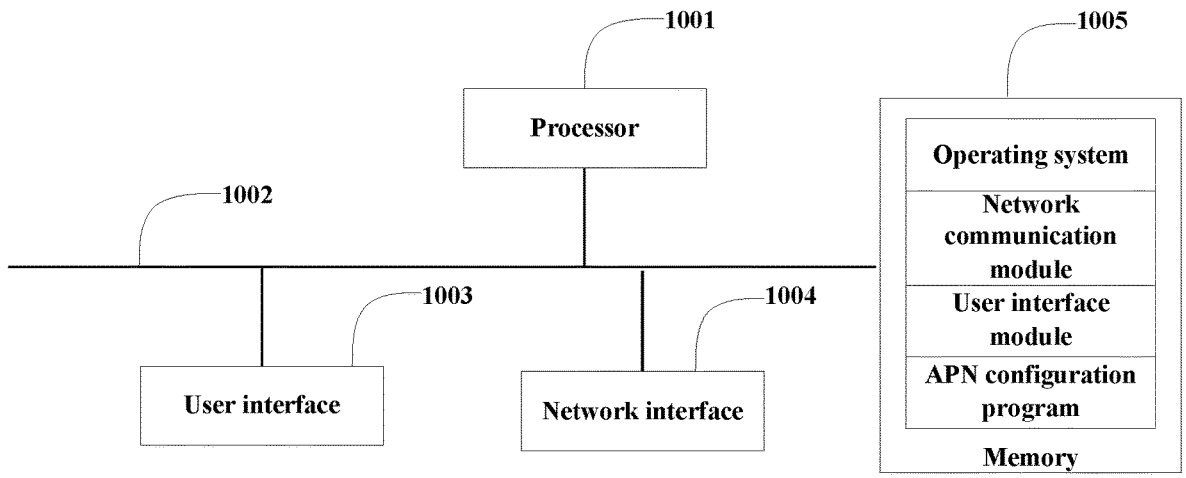
FIG. 1 is a schematic structural diagram of a hardware running environment of an APN configuration method according to at least one embodiment of the present disclosure.

FIG. 1 is a schematic structural diagram of a hardware running environment of an APN configuration method according to at least one embodiment of the present disclosure.

The hardware structure shown in FIG. 1 may be included in a terminal. The terminal may be a Personal Computer (PC), and may also be a mobile terminal device having a display function, such as a smart phone, a tablet computer, an e-book reader, a Moving Picture Experts Group Audio Layer III (MP3) player, a Moving Picture Experts Group Audio Layer IV (MP4) player, and a portable computer.

As shown in FIG. 1, the terminal may include: a processor 1001, for example, a Central Processing Unit (CPU), a communication bus 1002, a user interface 1003, a network interface 1004, and a memory 1005. The communication bus 1002 may be configured to implement a communication connection between these components. The user interface 1003 may include a display, and an input unit such as a Keyboard. The user interface 1003 may also include a standard wired interface and/or a standard wireless interface. The network interface 1004 may include a standard wired interface and/or a standard wireless interface (such as a Wi-Fi (mobile hotspot) interface). The memory 1005 may be a high-speed RAM memory, or may also be a Non-Volatile Memory, for example, a magnetic disk memory. The memory 1005 may also be a storage device independent of the foregoing processor 1001.

According to the embodiments provided in the present disclosure, the terminal may further include a camera, a Radio Frequency (RF) circuit, a sensor, an audio circuit, a Wi-Fi module, and the like. The sensor may include an optical sensor, a motion sensor, and/or other sensors. The light sensor may include an ambient light sensor and a proximity sensor. Based on the ambient light sensor, the terminal can adjust the brightness of the display screen according to the brightness and darkness of the ambient light. Based on the proximity sensor, the terminal can turn off the display screen and/or the backlight when the terminal moves to the ear. As one type of motion sensor, a gravitational acceleration sensor can detect the magnitude of accelerations in various directions (generally three axes), and detect the magnitude and direction of the gravity when being stationary. The gravitational acceleration sensor can be used in applications (such as horizontal and vertical screen switching, related games, magnetometer posture calibration) requiring the reorganization of a terminal posture, and vibration recognition related functions (such as a pedometer and knocking), and the like. Certainly, other sensors such as a gyroscope, a barometer, a hygrometer, a thermometer, and an infrared sensor may also be provided in the mobile terminal device, and details are not described herein.

A person having ordinary skill in the art can understand that the structure of the terminal shown in FIG. 1 does not constitute limitations on the terminal, and the terminal may include more or fewer components than those shown in FIG. 1, or may have at least one components formed by the combination of some components, or have different component arrangements.

As shown in FIG. 1, the memory 1005, when serving as a computer storage medium, may store an operating system, a network communication module, a user interface module, and a network operation control program.

In the terminal shown in FIG. 1, the network interface 1004 may be mainly configured to connect to a background server and perform data communication with the background server. The user interface 1003 may be mainly configured to connect to a client (user end) to perform data communication with the client. The processor 1001 may be configured to invoke the network operation control program stored in the memory 1005, and execute the following operations: determining an APN category of an candidate APN, wherein the APN category of the candidate APN includes an APN used in a 5G network or an APN used in a non-5G network; determining, according to a configuration parameter of the terminal, a network mode of the terminal, wherein the network mode includes a network mode supporting the 5G network or a network mode not supporting the 5G network; and determining whether to execute network access based on the candidate APN according to whether the APN category matches the network mode of the terminal.

According to the embodiments provided by the present disclosure, the processor 1001 may invoke the network operation control program stored in the memory 1005 to further perform the following operations: testing, based on the candidate APN, an average network speed of a network corresponding to the candidate APN; and in response to determining that the average network speed is not less than a set network speed threshold, determining that the candidate APN is the APN used in the 5G network, and in response to determining that the average network speed is less than the set network speed threshold, determining that the candidate APN is the APN used in the non-5G network.

According to the embodiments provided in the present disclosure, before determining the APN category of the candidate APN, the processor 1001 may invoke the network operation control program stored in the memory 1005 to further perform the following operations: determining, based on parameter information of the candidate APN, that an APN type of the candidate APN is a network type. The parameter information of the candidate APN includes at least one of: operator identifier information, a Mobile Country Code (MCC), a Mobile Network Code (MNC) and/or the APN type. The APN type includes the network type or a multimedia message type.

According to the embodiments provided in the present disclosure, before determining that the APN type of the candidate APN is the network type, the processor 1001 may invoke the network operation control program stored in the memory 1005 to further perform the following operations: sending the parameter information of the candidate APN to a network side so that the network side determines that the candidate APN is valid; and determining that the candidate APN is valid based on information fed back by the network side and indicating that the candidate APN is valid.

According to the embodiments provided in the present disclosure, before determining the APN category of the candidate APN, the processor 1001 may invoke the network operation control program stored in the memory 1005 to further perform the following operations: reading a subscriber identity card to obtain the operator identifier information, the MCC and the MNC; and looking up, according to the operator identifier information, the MCC and the MNC, in an APN database to obtain a corresponding APN list. The APN list at least includes the candidate APN, and correspondingly stores the candidate APN and the parameter information of the candidate APN.

According to the embodiments provided in the present disclosure, after obtaining the APN list and before determining the APN category of the candidate APN, the processor 1001 may invoke the network operation control program stored in the memory 1005 to further perform the following operations: determining that the number of APNs, that are valid and whose APN type is the network type, in the APN list is greater than 1.

According to the embodiments provided in the present disclosure, the processor 1001 may invoke the network operation control program stored in the memory 1005 to further perform the following operations: in response to determining that the APN category of the candidate APN is the APN used in the 5G network and the network mode of the terminal is a network mode not supporting the 5G network, determining not to execute the network access based on the candidate APN.

According to the embodiments provided in the present disclosure, the configuration parameter of the terminal may include at least one of: a network mode setting parameter, a model type parameter, and an International Mobile Equipment Identity (IMEI).

Figure 2:
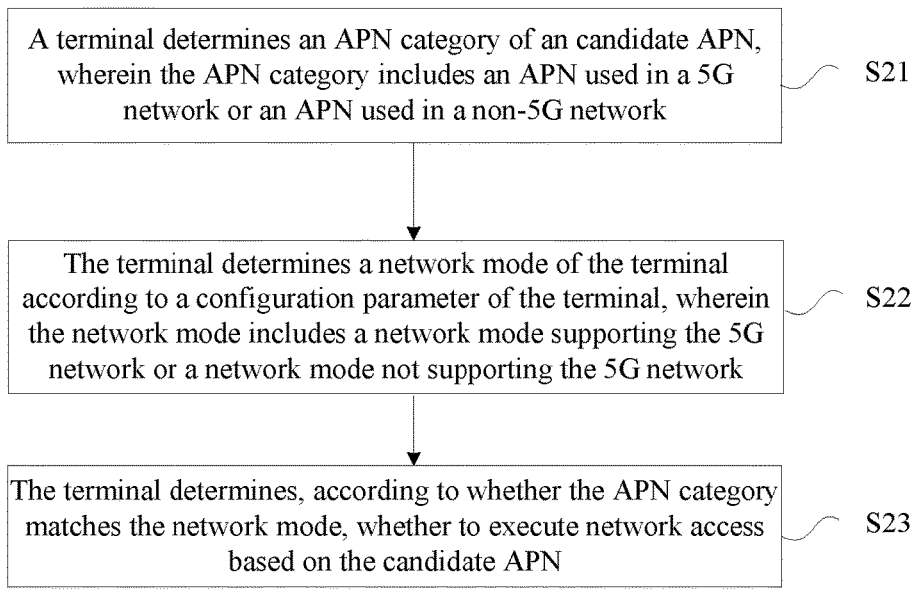
FIG. 2 is a schematic flowchart of an APN configuration method according to at least one embodiment of the present disclosure.

The embodiments of the present disclosure also provide an APN configuration method. As shown in FIG. 2, which is a schematic flowchart of the APN configuration method provided in at least one embodiment of the present disclosure, the method may include operation S21 to operation S23.

In operation S21, a terminal determines an APN category of a candidate APN, wherein the APN category of the candidate APN includes an APN used in a 5G network or an APN used in a non-5G network.

According to the embodiments provided in the present disclosure, the operation that the terminal determines the APN category of the candidate APN may include: the terminal tests, based on the candidate APN, an average network speed of a network corresponding to the candidate APN; and in response to determining that the average network speed is not less than a set network speed threshold, the terminal determines that the candidate APN is the APN used in the 5G network, and in response to determining that the average network speed is less than the set network speed threshold, the terminal determines that the candidate APN is the APN used in the non-5G network.

According to the embodiments provided in the present disclosure, before the terminal determines the APN category of the candidate APN, the method may further include: the terminal determines, based on parameter information of the candidate APN, that an APN type of the candidate APN is a network type. The parameter information of the candidate APN may include operator identifier information, MCC, MNC, and/or the APN type. The APN type includes a network type or a multimedia message type.

According to the embodiments provided in the present disclosure, before the terminal determines that the APN type of the candidate APN is the network type, the method may further include: the terminal sends the parameter information of the candidate APN to a network side so that the network side determines that the candidate APN is valid; and the terminal determines that the candidate APN is valid based on information fed back by the network side and indicating that the candidate APN is valid.

In operation S22, the terminal determines a network mode of the terminal according to a configuration parameter of the terminal, wherein the network mode includes a network mode supporting the 5G network or a network mode not supporting the 5G network.

According to the embodiments provided by the present disclosure, the configuration parameter of the terminal may include at least one of: a network mode setting parameter, a model type parameter, and an IMEI.

In operation S23, the terminal determines, according to whether the APN category matches the network mode of the terminal, whether to execute network access based on the candidate APN.

According to the embodiments provided in the present disclosure, the operation that the terminal determines, according to whether the APN category matches the network mode of the terminal, whether to perform the network access based on the candidate APN may include: in response to determining that the APN category of the candidate APN is the APN used in the 5G network and the network mode of the terminal is a network mode not supporting the 5G network, the terminal determines not to execute the network access based on the candidate APN; in response to determining that the APN category of the candidate APN is the APN used in the 5G network and the network mode of the terminal is a network mode supporting the 5G network, the terminal may execute the network access based on the candidate APN, or the terminal may not execute the network access based on the candidate APN; in response to determining that the APN category of the candidate APN is the APN used in the non-5G network, the terminal may execute the network access based on the candidate APN, or the terminal may not execute the network access based on the candidate APN.

According to the embodiments provided by the present disclosure, before operation S21, the method may further include: the terminal reads a preset identification parameter in a subscriber identity card, and looks up, according to a preset mapping relation, in an APN database to obtain an APN list corresponding to the preset identification parameter.

According to at least one embodiment of the present disclosure, the preset identification parameter in the subscriber identity card may include at least one of: operator identifier information, an MCC and an MNC.

According to the embodiments provided in the present disclosure, the APN list at least includes the candidate APN, and correspondingly stores the candidate APN and the parameter information of the candidate APN.

According to the embodiments provided in the present disclosure, after the terminal obtains the APN list and before the terminal determines the APN category of the candidate APN, the method may further include: the terminal determines that the number of APNs, that are valid and whose APN type is the network type, in the APN list is greater than 1.

At present, the 5G network is in the early stage of construction, and it is difficult for operators to take full consideration of the influence of the formulation of the new APN dedicated for the 5G network on the existing terminals not supporting the 5G technologies in the process of using the mobile data network, thus resulting in the problem that the mobile terminals not supporting the 5G technologies use the APN dedicated for the 5G network in the case that both the APN used in a 5G network and the APN used in a non-5G network exist.

For example, an operator formulates an APN parameter dedicated for a 5G network, and an IMEI number segment is allocated to a small amount of 5G terminals to support a 5G function. If a terminal not supporting the 5G function uses the APN dedicated for the 5G network to perform network registration, the network access function will be abnormal.

In order to solve the problem, the APN configuration method provided in the embodiments of the present disclosure can obtain an APN list according to a preset identification parameter, and can determine an APN category of each candidate APN in the APN list, i.e., determine whether each candidate APN is an APN used in a 5G network or an APN used in a non-5G network. Further, the terminal can determine a network mode of the terminal according to a configuration parameter of the terminal, i.e., determine whether the terminal supports a 5G network or does not support the 5G network. In this way, the terminal can additionally refer to the above pre judgment information when determining which APN, i.e., an APN used in a 5G network or an APN used in a non-5G network, to use for network connection, thereby reducing the possibility that the terminal which does not support 5G mistakenly uses the APN dedicated for the 5G network.

According to the embodiments provided in the present disclosure, the APN used in the 5G network may be set as a non-configurable APN, so that the terminal can exclude the APN used in the 5G network, thereby enabling the configuration method to be suitable for the terminal not supporting the 5G to perform an effective network connection operation in various networking scenarios, and improving the user experience.

According to the embodiments provided in the present disclosure, the APN configuration method may be applied to an APN configuration system. The APN configuration system may include a terminal, an APN database and a subscriber identity card. When a user triggers a network access instruction, the terminal receives the network access instruction, confirms a subscriber identity card for performing a network connection operation in the terminal, and reads a preset identification parameter in the subscriber identity card. The subscriber identity card may be a Subscriber Identity Module (SIM) card, a Universal Subscriber Identity Module (UISM) card, or a User Identity Model (UIM) card. The preset identification parameter may include at least an MCC and an MNC. The terminal looks up, according to a preset mapping relationship, in the APN database in the terminal to obtain an APN list corresponding to the preset identification parameter in the subscriber identity card. The preset mapping relationship may be name information and type information of one or more APNs corresponding to a combination of one MCC and one MNC. The APN list may contain information including name information, type information, an operator name, and the like of the APN which are associatively stored.

For example, in one exemplary implementation, the terminal reads the SIM card to obtain that the MCC is 825 (i.e., the MCC of China), and that the MNC is 02 (i.e., the MNC for the operator China Mobile). According to the preset mapping relationship, three APNs corresponding to the MCC of 02 and the MNC of 825 are found in an APN database stored in the terminal, the names of the three APNs are omiga_5G, omiga and omiga_mms respectively, and the APN types respectively corresponding to the three APNs are default (i.e., a mobile network type which supports network connection by default, that is, the APN type is a network type), default supl (i.e., a mobile network type which supports network connection by default and supports A-GPS customization, that is, the APN type is a network type), and mms (i.e., the APN type is a multimedia message type).

According to the embodiments provided by the present disclosure, the terminal may obtain a configuration parameter of the terminal, so as to determine whether the network mode of the terminal is a network mode supporting 5G. The configuration parameter of the terminal may be an IMEI number segment of the terminal, network mode configuration information of the terminal, a chip type, model information, or the like. For example, the terminal may find out, by obtaining the model information of the terminal, the network type that is supported by the model, so as to determine whether the terminal supports the 5G network mode.

According to the embodiments provided by the present disclosure, if the network mode of the terminal is a network mode not supporting the 5G network, then the terminal determines, through a preset rule, an APN whose APN category is the APN used in the 5G network among all the candidate APNs.

According to the embodiments provided by the present disclosure, the preset rule may be determining that the APN category of the candidate APN is the APN used in the 5G network when a 5G keyword exists in name information of the candidate APN. Alternatively, a mobile network capability reference value of a candidate APN may be obtained, and whether the APN category of the candidate APN is an APN used in the 5G network is determined based on an average network speed reference value in the mobile network capability reference value. For example, if the average network speed reference value falls within the speed range of a 5G network, it is determined that the APN category of the candidate APN is the APN used in the 5G network; and if the average network speed reference value does not fall within the speed range of the 5G network, it is determined that the APN category of the candidate APN is the APN used in a non-5G network.

According to the embodiments provided by the present disclosure, name information of a plurality of APNs found in the APN list according to the preset mapping relationship may be referred to as an APN name information group. The mobile network capability reference value is a network connection capability reference value or an average network speed reference value obtained by the terminal by performing a polling operation on a plurality of APNs in the APN list. Before determining the APN used in the 5G network, the terminal may firstly determine whether an APN used in the 5G network exists in the APN list. For example, the terminal may determine whether an APN used in the 5G network exists in the APN list based on the 5G keyword in the APN name information group or the APN category of each APN.

According to the embodiments provided by the present disclosure, after determining that the APN category of the candidate APN is the APN used in the 5G network and the network mode of the terminal is a network mode not supporting the 5G network, the terminal may further set the candidate APN as a non-configurable APN. When selecting an APN to connect to the network, the terminal will not select this candidate APN. The terminal may add a non-configurable name identifier character into a name field of the candidate APN, and list the APN having the non-configurable name identifier character into a non-configurable APN list; or after receiving APN error information, the APN is added into the non-configurable APN list and the APN error information is sent to the terminal when determining that an APN used in a 5G network exists in the candidate APNs.

According to the APN configuration method provided in the embodiments of the present disclosure, a preset identification parameter in a subscriber identity card may be read, and an APN list corresponding to the preset identification parameter can be found in an APN database according to a preset mapping relationship; a configuration parameter of a terminal may be obtained, and whether the network mode of the terminal is a network mode supporting 5G may be determined, based on the configuration parameter; if the network mode of the terminal is a network mode not supporting the 5G network, the terminal does not use the APN whose APN category is the APN used in the 5G network to execute network access, and the APN used in the 5G network may be set as a non-configurable APN. By means of the method, the possibility that a terminal not supporting 5G mistakenly uses an APN used in the 5G network is reduced. In addition, an APN used in the 5G network is set to be a non-configurable APN, based on which the terminal excludes the APN used in the 5G network, so that the configuration method is applicable for a terminal not supporting the 5G to perform an effective network connection operation in various networking scenarios, thereby improving the user experience, and solving the problem that a terminal not supporting the 5G has an abnormal network access in the case where the APN used in 5G and other APNs simultaneously exist.

Figure 3:
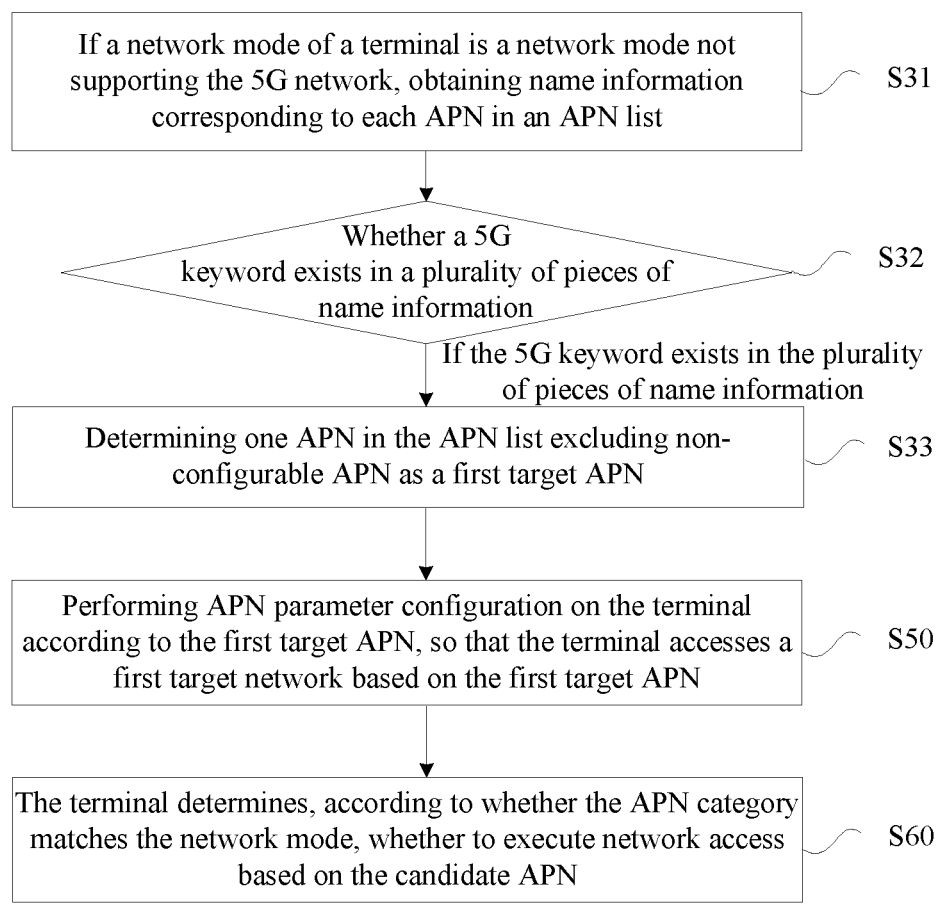
FIG. 3 is another schematic flowchart of an APN configuration method according to at least one embodiment of the present disclosure.

As shown in FIG. 3, which is another schematic flowchart of an APN configuration method provided in the embodiments of the present disclosure. The operation S23 may include operation S31-operation S33.

In operation S31, if the network mode of the terminal is a network mode not supporting the 5G network, then name information corresponding to each APN in the APN list is obtained.

In operation S32, it is determined whether a 5G keyword exists in the plurality of pieces of name information.

According to the embodiments provided in the present disclosure, if it is judged, based on parameters such as terminal type information and chip type, that the terminal does not support the 5G network mode, then the terminal obtains a group of name information of multiple APNs from the obtained APN list, and checks whether there is a 5G keyword in the name information group.

In operation S33, if there is a 5G keyword in the plurality of pieces of name information, an APN whose APN category is an APN used in the 5G network is determined from the APN list according to the 5G keyword.

According to the embodiments provided by the present disclosure, if the terminal finds the 5G keyword in the obtained name information group, the terminal may directly determine that the candidate APN corresponding to this 5G keyword is the APN used in the 5G network according to the 5G keyword. For example, if the terminal obtains a name information group including three pieces of APN name information, i.e., omiga_5G, omiga, and omiga_mms, and finds that the omiga_5G in the three pieces of name information has a 5G keyword, the terminal directly determines the candidate APN named omiga_5G as the APN used in the 5G network.

According to the embodiments provided by the present disclosure, as shown in FIG. 3, after operation S33, the method may further include operation S50 and operation S60.

In operation S50, one APN is determined as a first target APN in the APN list excluding non-configurable APN (i.e., the APN whose APN category is the APN used in the 5G network).

In operation S60, an APN parameter configuration is performed on the terminal according to the first target APN, so that the terminal accesses a first target network based on the first target APN.

According to the embodiments provided by the present disclosure, after excluding the APN used in the 5G network from the APN list, the terminal with the network mode not supporting the 5G network determines one APN from the remaining APNs of the network type, and uses this APN as the first target APN. The terminal connects to a corresponding first target network based on the first target APN. The first target APN refers to one APN selected from an APN list excluding the APN used in the 5G network in a case where the terminal does not support the 5G network mode, and the first target APN is the mobile data network corresponding to the first target APN. For example, if the determined first target network is a 4G network with an APN of omiga, then the terminal connects to the corresponding 4G network based on this APN.

According to the APN configuration method provided in the embodiments of the present disclosure, if the network mode of the terminal is a network mode not supporting the 5G network, name information corresponding to each APN in an APN list is obtained, and it is determined whether a 5G keyword exists in the obtained name information. If the obtained name information includes a 5G keyword, an APN whose APN category is an APN used in the 5G network is determined in the APN list according to the 5G keyword. One APN is determined in the APN list excluding non-configurable APN as a first target APN. APN parameter configuration is performed on the terminal according to the first target APN, so that the terminal accesses a first target network based on the first target APN. By judging whether a 5G keyword exists in name information of an APN of a network type, a terminal can directly judge whether the corresponding APN is an APN used in the 5G network according to the 5G keyword, thereby omitting intermediate judgment operations and improving the network connection efficiency. By selecting one APN from the APNs of the network type excluding the APN used in a 5G network to perform a mobile network connection, abnormal situations caused by a terminal not supporting the 5G mistakenly using the APN used in the 5G network to perform network connection are avoided, and the user experience is improved.

Figure 4:
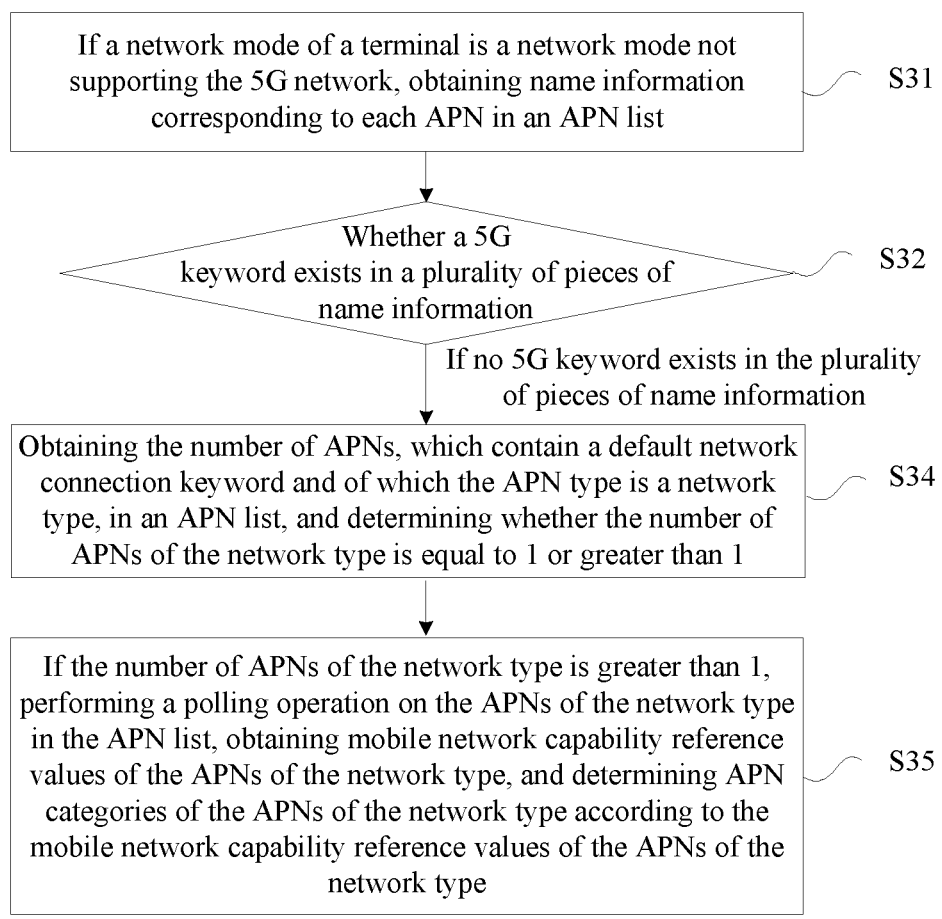
FIG. 4 is still another schematic flowchart of an APN configuration method according to at least one embodiment of the present disclosure.

FIG. 4 is still another schematic flowchart of an APN configuration method according to at least one embodiment of the present disclosure. After operation S32, the method may further include operation S34 and operation S35.

In operation S34, if there is no 5G keyword in the plurality of pieces of name information, the number of APNs, of which the APN type is the network type and which contain a default network connection keyword, in the APN list is obtained, and it is determined whether the number of APNs of the network type is equal to 1 or greater than 1.

In operation S35, if the number of APNs of the network type is greater than 1, a polling operation is performed on the APNs of the network type in the APN list, mobile network capability reference values of the APNs of the network type are obtained, and APN categories of the APNs of the network type are determined according to the mobile network capability reference values of the APNs of the network type.

According to the embodiments provided by the present disclosure, if the terminal does not find the 5G keyword in the above plurality of pieces of name information, then the terminal obtains an APN type information group corresponding to the above plurality of pieces of name information from the obtained APN list. The terminal searches for a default network connection keyword in the APN type information group, and takes a candidate APN corresponding to the type information containing the default network connection keyword as an APN of a network type. The default network connection keyword being default represents an APN of a default network connection type, which is used for accessing a mobile network of the Internet type. That is, the APN type being a network type refers to that the APN can access the mobile network of the Internet type. The terminal judges whether the corresponding number of the APNs of the network type is equal to 1 according to the number of pieces of type information containing the keyword 'default'. If the APN containing the keyword 'default' is not unique, that is, if the number of APNs of the network-type is greater than 1, the terminal performs a polling operation on the APNs of the network type, so as to obtain a mobile network capability reference value of each APN of the network type. The mobile network capability reference value includes a network access capability reference value, an average Network speed, and the like. The terminal determines the APN category of each APN of the network type after obtaining the mobile network capability reference value of each APN of the network type. It should be noted that, among the APN types except the APN used in the 5G network, only the APN type corresponding to the APN used in the 4G network includes the keyword 'default'. After the type of the APN used in the 5G network is also set to include the keyword 'default', if two pieces of type information including the keyword 'default' appear in the corresponding APN type information in the APNs of the same operator in the same country, it can be determined that the APN must be an APN used in the 5G network.

According to the embodiments of the present disclosure, in order to obtain the network access capability reference value of each APN of the network type, the terminal sets a timer and performs a polling operation on the APNs of the network type. The terminal reports parameter information corresponding to the APN of the network type which enters the polling state to the mobile network in each polling period, and determines the network access capability reference value corresponding to each APN of the network type according to the return value from the network.

According to the embodiments provided in the present disclosure, in order to obtain an average network speed reference value of the APNs of the network type, in a designated or conditionally determined idle period, the terminal performs operations, such as network connection and network data packet transmission, based on the APNs of the network type, and calculates a maximum average transmission data network speed value corresponding to each APN of the network type, including but not limited to an uploading and downloading network speed value. An exemplary calculation method is provided herein. For example, a terminal downloads or uploads data packets from/to a fixed network address link, and calculates the size of the data packet transmitted within a unit time; or the terminal reads a dynamic change or historical value of the size of the data packet in the fixed network address link. The terminal determines a standard category determination interval for determining the APN category according to conditions such as a transmission rate protocol requirement specified in 5G or 4G related protocols for mobile data packets. For example, since the APN named omiga_5g of the network type corresponds to a network speed of 1000M, and this network speed falls in the standard category determination interval of the 5G network mode according to the protocol, the APN category of the APN can be determined as the APN used in the 5G network.

According to the APN configuration method provided in the embodiments of the present disclosure, if there is no 5G keyword in a plurality of pieces of name information, the number of APNs, which contain the default network connection keyword and of which the APN type is the network type, in an APN list is obtained, and it is determined whether the number of the APNs of the network type is equal to 1 or greater than 1; if the number of the APNs of the network type is greater than 1, a polling operation is performed on the APNs of the network type in the APN list, a mobile network capability reference value of each APN of the network type is obtained, and the APN used in the 5G network is determined from the APNs of the network type according to their respective mobile network capability reference values. By means of judging the APN type information of a candidate APN whose name information does not contain a 5G keyword, and when there are APNs of the 4G network and the 5G network, a polling operation is performed on the APNs of the 4G network and the 5G network to obtain APN category information of each APN, so that when there is no 5G keyword, a terminal can also determine and exclude the APN used in a 5G network, thereby reducing the possibility of using the APN used in a 5G network by mistake for a terminal which does not support 5G. In addition, by selecting one APN from the APNs of the network type excluding the APN used in the 5G network to perform a mobile network connection, abnormal situations caused by a terminal not supporting the 5G mistakenly using the APN used in the 5G network to perform network connection are avoided, and user experience is improved.

According to the embodiments of the present disclosure, after the terminal determines the network mode of the terminal according to the configuration parameter of the terminal in operation S22, the method may further include operations a-f.

In operation a, if the network mode of the terminal is a network mode supporting a 5G network, the number of APNs, which contain a default network connection keyword and of which the APN type is the network type, in the APN list is obtained, and it is determined whether the number of APNs of the network type is equal to 1 or greater than 1.

In operation b, if the number of APNs of the network type is equal to 1, proceeding to operation c; otherwise, proceeding to operation d.

In operation c, the only APN which contains a default network connection keyword is determined as a second target APN, and APN parameter configuration is performed on the terminal according to the second target APN, so that the terminal connects to a second target network based on the second target APN.

According to the embodiments provided by the present disclosure, if it is judged, based on information such as the model information, that the network mode of the terminal is a network mode supporting the 5G network, the terminal obtains a type information group of respective APNs in the APN list, and looks up in the type information group for the type information containing a default network connection keyword 'default'. The terminal determines the APN corresponding to the type information containing the default network connection keyword 'default' as the APN of the network type, and determines whether the number of the APNs of the network type is equal to 1 or greater than 1. If the number of the APNs of the network type is equal to 1, then the terminal takes this unique APN of the network type as the second target APN, and connects to the corresponding second target network based on the configuration parameter of the second target APN. In the embodiments, the second target APN refers to the only APN in the case where the terminal supports the 5G network mode and there is only one APN that can be used for network connection, and the second target network is the mobile data network corresponding to this APN.

In operation d, the APNs of the network type are polled, and the mobile network capability reference values of the APNs of the network type are obtained.

In operation e, an APN of the network type with the fastest network speed is determined as a third target APN according to a network access capability reference value or an average network speed in the mobile network capability reference value of each APN of the network type.

In operation f, APN parameter configuration is performed on the terminal according to the third target APN, so that the terminal connects to the third target network based on the third target APN.

According to the embodiments provided in the present disclosure, if the number of APNs of the network type is greater than 1, that is, there are a plurality of APNs that can be used for network connection, the terminal performs a polling operation on the plurality of APNs of the network type, obtains a mobile network capability reference value, such as a network access capability reference value and an average network speed reference value, of each APN of the network type, and determines, according to the mobile network capability reference value of each APN of the network type, the APN with the fastest network speed in a current networking environment. The terminal takes this APN as a third target APN, performs parameter configuration based on the third target APN, and connects to a third target network corresponding to the third target parameter. The third target APN refers to an APN which has the fastest network speed in the current networking environment in the case that the terminal supports the 5G network mode and the APN that can be used for network connection is not unique, and the third target APN is the mobile data network corresponding to this APN.

According to the embodiments of the present disclosure, the APN configuration method may further include operation g and operation h.

In operation g, in response to determining that the network mode of the terminal is a network mode not supporting the 5G network, an APN whose APN category is the APN used in the 5G network is determined in the APN list.

In operation h, a non-configurable indication field is added in the name information corresponding to the APN whose APN category is the APN used in the 5G network, so as to set this APN used in the 5G network as a non-configurable APN.

According to the embodiments provided in the present disclosure, a terminal determines, in the APN list, an APN used in the 5G network according to obtained APN category information of each APN. In the case where a terminal does not support a 5G network, the terminal adds, in the APN list, an indication field indicating that the APN is an APN of the 5G network in name information corresponding to the APN used in the 5G network, so that the terminal directly determines and excludes the APN used in the 5G network according to the name information.

According to the APN configuration method provided in the embodiments of the present disclosure, if the network mode of the terminal is a network mode supporting 5G, the number of APNs, which contain a default network connection keyword and of which the APN type is the network type, in an APN list is obtained, and it is determined whether the number of APNs of the network type is equal to 1 or greater than 1; if the number of the APNs of the network type is equal to 1, this APN containing the default network connection keyword is determined as a second target APN, and APN parameter configuration is performed on the terminal according to the second target APN, so that the terminal connects to the second target network based on the second target APN. If the number of the APNs of the network type is greater than 1, a polling operation is performed on the APNs of the network type, and a mobile network capability reference value of each APN of the network type is obtained; according to a network access capability reference value or an average network speed in the mobile network capability reference value of each APN of the network type, an APN of the network type with the fastest network speed is determined as a third target APN, and APN parameter configuration is performed on the terminal according to the third target APN, so that the terminal connects to the third target network based on the third target APN. In the case where it is determined that the network mode of the terminal is a network mode not supporting the 5G network, an APN used in the 5G network is determined in an APN list, and a non-configurable indication field is added in name information of the APN used in the 5G network so as to set the APN used in the 5G network as a non-configurable APN. By means of the method, in the case where a terminal can support a 5G network mode, it is determined whether the APN of the network type is unique, and when the APN of the network type is unique, the terminal directly uses this APN as a target APN, thereby simplifying the operation of determining the target APN by the terminal, and improving the user experience at the same time. When the APN of the network type is not unique, a polling operation is performed to select an APN with the fastest network speed from the APNs of the network type to perform network connection, thereby improving the network connection quality and improving the user experience at the same time. In the case where a terminal does not support a 5G network mode, a non-configurable indication field is added to name information corresponding to an APN which has been determined as an APN used in the 5G network, so that it is not necessary for the terminal to judge this APN in a subsequent network connection process, thereby improving the network connection efficiency.

An embodiment of the present disclosure provides a computer-readable storage medium, on which an APN configuration program is stored. When the APN configuration program is executed by a processor, at least one operation of the APN configuration method provided in the embodiments of the present disclosure is implemented. For the method implemented when the APN configuration program is executed, reference may be made to the related description of the APN configuration method in the embodiments of the present disclosure, and details are not repeated herein.

An embodiment of the present disclosure provides an APN configuration apparatus, including: a processor, a memory, and an APN configuration program stored in the memory and operable on the processor. When the APN configuration program is executed by the processor, at least one operation of the APN configuration method provided in the embodiments of the present disclosure is implemented. For the method implemented when the APN configuration program is executed, reference may be made to the related description of the APN configuration method in the embodiments of the present disclosure, and details are not repeated herein.

It should be noted that, in this specification, the terms "include", "contain", or any other variation thereof are intended to cover a non-exclusive inclusion, so that a process, a method, an object, or a system that includes a series of elements not only includes those elements, but also may further include other elements that are not explicitly listed, or may further include inherent elements of the process, the method, the object, or the system. An element limited by "including a . . . " does not exclude that there are other same elements in the process, method, object, or system that includes this element, unless there are more limitations.

The serial numbers of the embodiments of the present disclosure are only for description, and do not represent the preference of the embodiments.

Based on the description of the foregoing embodiments, a person having ordinary skill in the art could clearly understand that the method in the foregoing embodiments can be implemented by software in addition to a necessary general-purpose hardware platform, or may also be implemented by hardware. However, in many cases, the former is a preferred implementation. Based on such understanding, the essence of the technical solutions of the embodiments of the present disclosure, or in other word, the part contributing to the conventional art may be embodied in the form of a software product. The computer software product is stored in the foregoing storage medium (for example, ROM/RAM, a magnetic disk, and an optical disk), and includes a plurality of instructions for instructing a terminal device (which may be a mobile phone, a computer, a server, an air conditioner, or a network device) to execute the methods described in the embodiments of the present disclosure.

The foregoing descriptions are merely exemplary embodiments of the present disclosure, but are not intended to limit the patent scope of the present disclosure. Any equivalent structure or equivalent process modification made according to the description and the accompanying drawings of the present disclosure, or direct or indirect application in other related technical fields, shall fall within the patent scope of protection of the present disclosure.

What is claimed is:

1. An Access Point Name (APN) configuration method, comprising:
   determining, by a terminal, an APN category of a candidate APN, wherein the APN category of the candidate APN comprises an APN used in a 5th Generation (5G) network or an APN used in a non-5G network; and
   determining, by the terminal, a network mode of the terminal according to a configuration parameter of the terminal, wherein the network mode comprises a network mode supporting the 5G network or a network mode not supporting the 5G network; and
   further comprising:
   in response to determining that the APN category of the candidate APN is the APN used in the 5G network and the network mode of the terminal is a network mode not supporting the 5G network, determining, by the terminal, not to execute the network access based on the candidate APN;
   or,
   in response to determining that the APN category of the candidate APN is the APN used in the 5G network and the network mode of the terminal is a network mode supporting the 5G network, determining, by the terminal, to execute the network access based on the candidate APN;
   or,
   in response to determining that the APN category of the candidate APN is the APN used in the non-5G network, determining, by the terminal, to execute the network access based on the candidate APN, or determining, by the terminal, not to execute the network access based on the candidate APN.

2. The APN configuration method according to claim 1, wherein determining, by the terminal, the APN category of the candidate APN comprises:
   testing, by the terminal and based on the candidate APN, an average network speed of a network corresponding to the candidate APN; and
   determining, by the terminal and in response to determining that the average network speed is not less than a set network speed threshold, that the candidate APN is the APN used in the 5G network, and
   determining, by the terminal and in response to determining that the average network speed is less than the set network speed threshold, that the candidate APN is the APN used in the non-5G network.

3. The APN configuration method according to claim 2, wherein before determining, by the terminal, the APN category of the candidate APN, the method further comprises:
   determining, by the terminal and based on parameter information of the candidate APN, that an APN type of the candidate APN is a network type,
   wherein the parameter information of the candidate APN comprises at least one of: operator identifier information, a Mobile Country Code (MCC), a Mobile Network Code (MNC) and the APN type; and the APN type comprises the network type or a multimedia message type.

4. The APN configuration method according to claim 3, wherein before determining, by the terminal, that the APN type of the candidate APN is the network type, the method further comprises:
   sending, by the terminal, the parameter information of the candidate APN to a network side so that the network side determines that the candidate APN is valid; and
   determining, by the terminal, that the candidate APN is valid based on information fed back by the network side and indicating that the candidate APN is valid.

5. The APN configuration method according to claim 4, wherein before determining, by the terminal, the APN category of the candidate APN, the method further comprises:
   reading, by the terminal, a subscriber identity card to obtain the operator identifier information, the MCC and the MNC; and
   looking up, by the terminal and according to the operator identifier information, the MCC and the MNC, in an APN database to obtain a corresponding APN list, wherein the APN list at least comprises the candidate APN, and correspondingly stores the candidate APN and the parameter information of the candidate APN.

6. The APN configuration method according to claim 5, wherein after obtaining, by the terminal, the APN list and before determining, by the terminal, the APN category of the candidate APN, the method further comprises:
   determining, by the terminal, that the number of APNs, that are valid and whose APN type is the network type, in the APN list is greater than 1.

7. The APN configuration method according to claim 1, wherein the configuration parameter of the terminal comprises at least one of: a network mode setting parameter, a model type parameter, and an International Mobile Equipment Identity (IMEI).

8. An Access Point Name (APN) configuration apparatus, comprising: a memory, a processor, and an APN configuration program stored in the memory and capable of running on the processor, wherein the processor, when running the APN configuration program, is configured to:
   determine an APN category of a candidate APN, wherein the APN category of the candidate APN comprises an APN used in a 5th Generation (5G) network or an APN used in a non-5G network; and
   determine a network mode of the terminal according to a configuration parameter of the terminal, wherein the network mode comprises a network mode supporting the 5G network or a network mode not supporting the 5G network; and
   wherein the processor, when running the APN configuration program, is further configured to:
   in response to determining that the APN category of the candidate APN is the APN used in the 5G network and the network mode of the terminal is a network mode not supporting the 5G network, determine not to execute the network access based on the candidate APN;
   or,
   in response to determining that the APN category of the candidate APN is the APN used in the 5G network and the network mode of the terminal is a network mode supporting the 5G network, determine to execute the network access based on the candidate APN;
   or,
   in response to determining that the APN category of the candidate APN is the APN used in the non-5G network, determine to execute the network access based on the candidate APN or determine not to execute the network access based on the candidate APN.

9. A non-transitory computer-readable storage medium, on which an Access Point Name (APN) configuration program is stored, wherein the APN configuration program, when executed by a processor, is configured to:
   determine an APN category of a candidate APN, wherein the APN category of the candidate APN comprises an APN used in a 5th Generation (5G) network or an APN used in a non-5G network; and determine a network mode of the terminal according to a configuration parameter of the terminal, wherein the network mode comprises a network mode supporting the 5G network or a network mode not supporting the 5G network; and wherein the APN configuration program, when executed by a processor, is further configured to:

in response to determining that the APN category of the candidate APN is the APN used in the 5G network and the network mode of the terminal is a network mode not supporting the 5G network, determine not to execute the network access based on the candidate APN;

or, in response to determining that the APN category of the candidate APN is the APN used in the 5G network and the network mode of the terminal is a network mode supporting the 5G network, determine to execute the network access based on the candidate APN;

or, in response to determining that the APN category of the candidate APN is the APN used in the non-5G network, determine to execute the network access based on the candidate APN, or determine not to execute the network access based on the candidate APN.

10. The APN configuration method according to claim 1, wherein before determining, by the terminal, the APN category of the candidate APN, the method further comprises:

reading, by the terminal, a preset identification parameter in a subscriber identity card; and looking up, by the terminal and according to a preset mapping relation, in an APN database to obtain an APN list corresponding to the preset identification parameter.

11. The APN configuration method according to claim 5, wherein determining, by the terminal, the APN category of the candidate APN comprises:

determining, by the terminal, that the APN category of the candidate APN is the APN used in the 5G network when a 5G keyword exists in name information of the candidate APN; or, obtaining, by the terminal, a mobile network capability reference value of the candidate APN, and determining, by the terminal, whether the APN category of the candidate APN is the APN used in the 5G network based on an average network speed reference value in the mobile network capability reference value.

12. The APN configuration method according to claim 11, wherein determining, by the terminal, whether the APN category of the candidate APN is the APN used in the 5G network based on an average network speed reference value in the mobile network capability reference value comprises:

if the average network speed reference value falls within a speed range of the 5G network, determining that the APN category of the candidate APN is the APN used in the 5G network; and if the average network speed reference value does not fall within the speed range of the 5G network, determining that the APN category of the candidate APN is the APN used in the non-5G network.

13. The APN configuration method according to claim 1, wherein after determining that the APN category of the candidate APN is the APN used in the 5G network and the network mode of the terminal is a network mode not supporting the 5G network, further comprising:

setting, by the terminal, the candidate APN as a non-configurable APN.

14. The APN configuration method according to claim 13, wherein setting, by the terminal, the candidate APN as a non-configurable APN comprises:

adding, by the terminal, a non-configurable name identifier character into a name field of the candidate APN, and listing, by the terminal, the APN having the non-configurable name identifier character into a non-configurable APN list; or after receiving APN error information sent to the terminal when determining that an APN used in the 5G network exists in candidate APNs, adding, by the terminal, the APN used in the 5G network into the non-configurable APN list.

15. The APN configuration apparatus according to claim 8, wherein the processor, when being configured to determine the APN category of the candidate APN, is configured to:

test, based on the candidate APN, an average network speed of a network corresponding to the candidate APN; and determine, in response to determining that the average network speed is not less than a set network speed threshold, that the candidate APN is the APN used in the 5G network, and determine, in response to determining that the average network speed is less than the set network speed threshold, that the candidate APN is the APN used in the non-5G network.

16. The APN configuration apparatus according to claim 15, wherein the processor, when running the APN configuration program, is further configured to:

determine, based on parameter information of the candidate APN, that an APN type of the candidate APN is a network type, wherein the parameter information of the candidate APN comprises at least one of: operator identifier information, a Mobile Country Code (MCC), a Mobile Network Code (MNC) and the APN type; and the APN type comprises the network type or a multimedia message type.

* * * * *